United States Patent
Miller et al.

(10) Patent No.: US 10,059,346 B2
(45) Date of Patent: Aug. 28, 2018

(54) DRIVER COMPETENCY DURING AUTONOMOUS HANDOFF

(71) Applicant: Ford Global Technologies, LLC, Dearborn, MI (US)

(72) Inventors: Kenneth James Miller, Canton, MI (US); William Paul Perkins, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 4 days.

(21) Appl. No.: 15/175,128

(22) Filed: Jun. 7, 2016

(65) Prior Publication Data

US 2017/0349186 A1 Dec. 7, 2017

(51) Int. Cl.
| | |
|---|---|
| *G01C 22/00* | (2006.01) |
| *B60W 50/08* | (2012.01) |
| *G05D 1/00* | (2006.01) |
| *B60W 50/00* | (2006.01) |
| *B60W 40/08* | (2012.01) |

(52) U.S. Cl.
CPC .......... *B60W 50/082* (2013.01); *B60W 40/08* (2013.01); *B60W 50/0098* (2013.01); *G05D 1/0088* (2013.01); *B60W 2040/0818* (2013.01); *B60W 2050/0095* (2013.01); *B60W 2540/28* (2013.01)

(58) Field of Classification Search
CPC .......... B60W 5050/082; G05D 1/0088; G05D 1/0272; G05D 1/027; G05D 1/0278; G05D 2201/0216; G05D 1/0255
USPC .............. 701/23, 36; 180/272, 364; 340/438
See application file for complete search history.

(56) References Cited

U.S. PATENT DOCUMENTS

| | | | | |
|---|---|---|---|---|
| 8,352,110 B1* | 1/2013 | Szybalski | .............. | B62D 1/286 |
| | | | | 701/23 |
| 8,823,530 B2* | 9/2014 | Green | ................... | B60K 28/06 |
| | | | | 180/272 |
| 9,308,914 B1 | 4/2016 | Sun et al. | | |
| 2010/0087987 A1* | 4/2010 | Huang | .................. | B60W 40/08 |
| | | | | 701/36 |
| 2010/0179715 A1* | 7/2010 | Puddy | .................. | G05D 1/0061 |
| | | | | 701/23 |

(Continued)

FOREIGN PATENT DOCUMENTS

| | | |
|---|---|---|
| DE | 10144797 A1 | 3/2003 |
| EP | 3219568 A1 | 9/2017 |
| GB | 2549377 A | 10/2017 |

OTHER PUBLICATIONS

UKIPO Search Report for Application No. GB1708944.2 dated Nov. 17, 2017 (7 pages).

*Primary Examiner* — Shardul D Patel
(74) *Attorney, Agent, or Firm* — Frank A. MacKenzie; Bejin Bieneman PLC (57) ABSTRACT

A vehicle system includes a processor and a memory accessible to the processor and storing instructions executable by the processor. The instructions include detecting a handoff request indicating a transition of a host vehicle from an autonomous mode of operation to a non-autonomous mode of operation and assessing driver competency. The handoff request is approved if the driver competency exceeds a predetermined threshold. Likewise, the handoff request is denied if the driver competency fails to exceed the predetermined threshold.

16 Claims, 3 Drawing Sheets

(56) References Cited

U.S. PATENT DOCUMENTS

| | | | |
|---|---|---|---|
| 2013/0002416 A1* | 1/2013 | Gazit | B62D 1/28 340/438 |
| 2014/0081521 A1* | 3/2014 | Frojdh | H04M 1/72583 701/36 |
| 2014/0088814 A1* | 3/2014 | You | G05D 1/0061 701/23 |
| 2014/0262705 A1* | 9/2014 | Srbinovski | B60R 16/005 200/61.54 |
| 2014/0300479 A1 | 10/2014 | Wolter et al. | |
| 2014/0303827 A1* | 10/2014 | Dolgov | B60W 30/00 701/23 |
| 2015/0149021 A1 | 5/2015 | Duncan et al. | |
| 2016/0020984 A1* | 1/2016 | Machida | H04L 41/04 709/217 |
| 2016/0023652 A1* | 1/2016 | Soo | B60W 20/20 701/22 |
| 2016/0107655 A1* | 4/2016 | Desnoyer | B60W 50/14 701/23 |
| 2016/0152137 A1* | 6/2016 | Sunahiro | F16H 63/18 180/364 |
| 2016/0179092 A1* | 6/2016 | Park | G05D 1/0061 701/23 |
| 2016/0209840 A1 | 7/2016 | Kim | |
| 2016/0246298 A1 | 8/2016 | Sato et al. | |
| 2016/0303972 A1 | 10/2016 | Kuhne et al. | |
| 2016/0325757 A1* | 11/2016 | Westlund | B60W 50/082 |
| 2017/0151950 A1* | 6/2017 | Lien | B60W 30/182 |
| 2017/0309092 A1* | 10/2017 | Rosenbaum | G07C 5/008 |

\* cited by examiner

DRIVER COMPETENCY DURING AUTONOMOUS HANDOFF

BACKGROUND

Autonomous vehicles automate certain driving-related tasks. Fully autonomous vehicles can control all steering, braking, and throttle during a trip. Partially autonomous vehicles can provide limited control over steering, braking, and throttle under particular circumstances, such as during a park-assist maneuver.

DETAILED DESCRIPTION

Autonomous vehicles may, under certain circumstances, transfer some or all vehicle control back to the driver. For example, a fully autonomous vehicle may transfer control back to the driver if the vehicle encounters a situation that it is not equipped to handle. Partially autonomous vehicles may return control to the driver when a particular maneuver is complete. This transfer of control may be referred to as a handoff procedure, or simply a "handoff".

Some handoffs may not be as smooth as others. If the handoff occurs on a freeway, for example, some drivers may have difficulty taking control of a fast-moving vehicle, which could result in jerky or otherwise erratic vehicle movements. Also drivers may react differently during the handoff. For instance, some drivers may respond to the handoff more quickly than others.

One way to address handoff-related concerns is for the vehicle to assess the driver's competency for the handoff and for the vehicle to handle the handoff according to the driver's competency. For instance, the vehicle may include a handoff system that detects a handoff request indicating a transition from an autonomous mode of operation to a non-autonomous mode of operation and assesses driver competency. The handoff system approves the handoff request if the driver competency exceeds a predetermined threshold and denies the handoff request if the driver competency fails to exceed the predetermined threshold, or the hand-off may be modified, for example by increasing the time of a warning before the handoff, and by increasing the level of a warning (experienced driver's may have no warning but inexperienced may get voice warning with coaching (e.g., "you need to take control of the steering soon"). In other words, the handoff may only be permitted for more experienced drivers, or the handoff may be modified for less experienced drivers.

Less experienced drivers may participate in various exercises to increase their driver competency shortly before a handoff is to occur, including at the beginning of a current drive event before the vehicle is driven, as well as for future handoffs that may occur during future trips. The exercises may include providing driver inputs to the steering wheel, brake pedal, or accelerator pedal. The driver competency may increase according to how well the driver responds to various prompts that are presented while the vehicle is operating autonomously. Thus, the prompts may serve to prepare the driver for a handoff expected to occur in the near future (e.g., just moments away). Further, the way the driver responds to the prompts may be used to evaluate how well the driver will handle future handoffs (e.g., handoffs that occur during other trips).

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
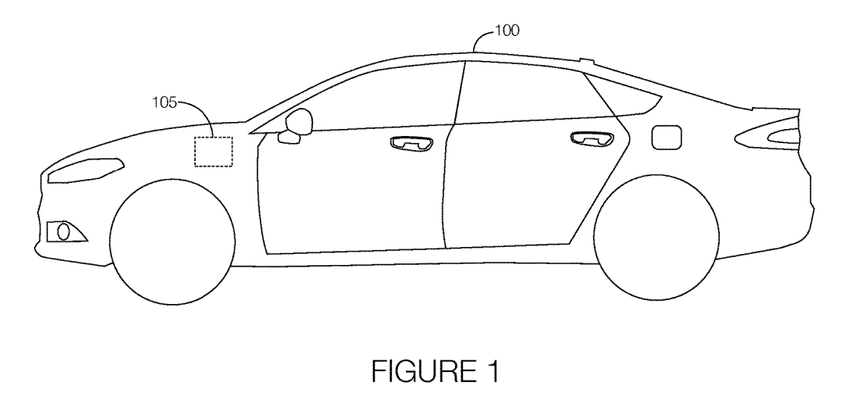
FIG. 1 illustrates an example autonomous vehicle with a handoff system that handles a handoff from an autonomous mode of operation to a non-autonomous mode of operation according to a driver competency.

As illustrated in FIG. 1, the host vehicle 100 includes a handoff system 105 that handles a transition from an autonomous mode of operation to a non-autonomous mode of operation. Although illustrated as a sedan, the host vehicle 100 may include any passenger or commercial automobile such as a car, a truck, a sport utility vehicle, a crossover vehicle, a van, a minivan, a taxi, a bus, etc. Further, the host vehicle 100 is an autonomous vehicle that operates in an autonomous (e.g., driverless) mode, a partially autonomous mode, and/or a non-autonomous mode. When operating in the autonomous mode, the host vehicle 100 at least partially controls various vehicle subsystems associated with controlling the steering, braking, and the accelerator pedal. When operating in a non-autonomous mode, the driver handles the steering, braking, and throttle via driver inputs provided to, e.g., a steering wheel, a brake pedal, and an accelerator pedal, respectively. The transition from the autonomous mode to the non-autonomous mode may be referred to as a handoff.

The handoff system 105 handles the handoff from the autonomous mode to the non-autonomous mode. In response to a handoff request, which may indicate that the host vehicle 100 is about to transition from the autonomous mode to the non-autonomous mode, the handoff system 105 determines if the driver is competent to operate the host vehicle 100 during and after the handoff. If so, the handoff system 105 permits the handoff to occur. That is, the handoff system 105 approves the handoff request. If the handoff system 105 determines that the driver is not competent to handle the handoff, the handoff system 105 at least temporarily denies the handoff request, which means that the host vehicle 100 continues to operate in the autonomous mode.

The handoff system 105 measures driver competency according to various training exercises performed while the host vehicle 100 is operating in the autonomous mode. For example, the handoff system 105 prompts the driver to provide certain driver inputs via, e.g., the steering wheel, the brake pedal, and the accelerator pedal. In response to such inputs, the handoff system 105 tests the driver's response time and how smoothly the driver provides the driver input. The handoff system 105 determines a driver competency as a result of the test and builds a profile for the driver that includes the driver competency. If the driver needs to improve his or her competency for handoffs, the handoff system 105 may provide a teaching mode where the driver can practice certain maneuvers and improve his or her driver competency.

Thus, the handoff system 105 prepares the driver to assume non-autonomous control of the host vehicle 100 when a handoff is expected to occur in the near future.

Further, the training serves to evaluate how well the driver will handle future handoffs, and can be used to teach the driver how to respond to future handoff requests.

Figure 2:
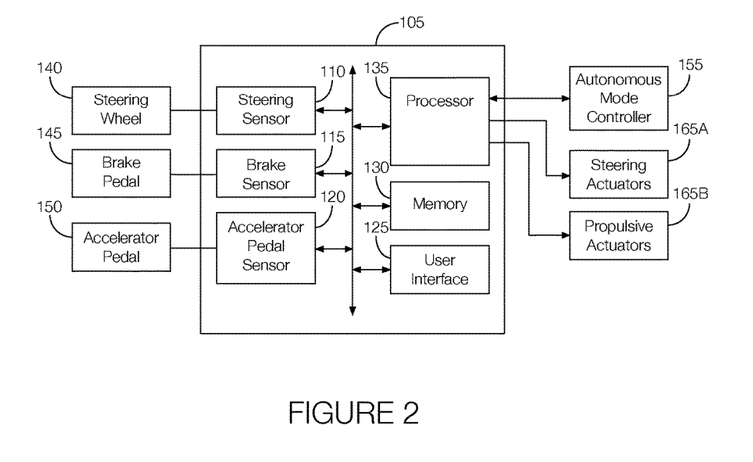
FIG. 2 is a block diagram showing example components of the handoff system of FIG. 1.

Referring now to FIG. 2, the handoff system 105 includes a steering sensor 110, a brake sensor, an accelerator pedal sensor 120, a user interface 125, a memory 130, and a processor 135.

The steering sensor 110 includes any circuit or other electronic components that can measure movement of a steering wheel 140 in response to a driver input. For instance, the steering sensor 110 may measure a steering angle based on how much the steering wheel 140 is turned. The steering sensor 110 may output a signal representing the steering angle. The signal output by the steering sensor 110 may further represent how quickly the steering wheel 140 was turned, overshoot relative to a particular steering angle, undershoot relative to a particular angle, etc. The steering sensor 110 may output the signal to the processor 135, the memory 130, or other components of the host vehicle 100.

The brake sensor 115 includes any circuit or other electronic components that can measure movement of a brake pedal 145, including how much pressure is applied to the brake pedal 145, in response to a driver input. The brake sensor 115 may output a signal representing as much. The signal output by the brake sensor 115 may further represent how quickly the brake pedal 145 was pressed, whether the brake pedal 145 was pressed too hard (overshoot), whether the brake pedal 145 was not pressed hard enough (undershoot), or the like. The brake sensor 115 may output the signal to the processor 135, the memory 130, or other vehicle components.

The accelerator pedal sensor 120 includes any circuit or other electronic components that can measure movement of the accelerator pedal 150 in response to a driver input. In some respects, the sensor 120 is similar to the brake sensor. For instance, the accelerator pedal sensor 120 may output a signal representing the movement of the accelerator pedal 150. The signal output by the accelerator pedal sensor 120 may represent how quickly the accelerator pedal 150 was pressed, whether the accelerator pedal 150 was pressed too hard (overshoot), whether the accelerator pedal 150 was not pressed hard enough (undershoot), or the like. The accelerator pedal sensor 120 may output the signal to the processor 135, the memory 130, or other vehicle components.

The user interface 125 includes any circuit or other electronic components that can receive user inputs, provide information to a user, or both. The user interface 125 may include a display screen or speakers for providing information to the user and an input device such as a microphone, keyboard, buttons, etc. for receiving user inputs. In one possible approach, the user interface 125 is incorporated into a touch-sensitive display screen that can both receive user inputs and present information to the user. Examples of information presented to the user may include various prompts during, e.g., the handoff procedure. The prompts may be presented audibly (e.g., voice prompts), visually, or a combination of both.

The memory 130 includes any circuit or other electronic components that can store data. Examples of data that may be stored in the memory 130 includes data associated with driver inputs provided to the steering wheel 140, the brake pedal 145, or the accelerator pedal 150. The memory 130 may further store a database that relates a particular driver to a profile with data, such as the driver competency, which as discussed previously represents the driver's ability to operate the host vehicle 100 during a handoff from the autonomous mode to the non-autonomous mode. The memory 130 may further store various computer-executable instructions, including instructions executed by the processor 135. Thus, the memory 130 may make such instructions available to the processor 135 and possibly other components of the host vehicle 100.

The processor 135 includes any circuit or other electronic components that can access and execute the computer-executable instructions stored in the memory 130. The processor 135 may be programmed to detect the handoff request, assess the driver competency, approve the handoff request if the driver competency exceeds a predetermined threshold, and either deny or modify the handoff request if the driver competency fails to exceed the predetermined threshold. Furthermore, the processor 135 uses multiple vehicle sensors to send out commands to the actuators (collectively, 165) to control the engine (for example via the throttle actuator, variable cam control, etc.) or electric motor, the brakes, and the steering. For purposes of simplicity, a steering actuator 165A can be controlled by the processor 135 to control the steering of the host vehicle 100 and propulsive actuators 165B can be controlled by the processor 135 to control the braking, acceleration, etc., of the host vehicle 100.

The processor 135 may receive the handoff request from an autonomous mode controller 155. For instance, the processor 135 may receive the handoff request after the autonomous mode controller 155 determines that the host vehicle 100 should transition from the autonomous mode of operation to the non-autonomous mode of operation. The autonomous mode controller 155 may make such a decision in response to a user input requesting non-autonomous control of the host vehicle 100 or when the host vehicle 100 is approaching a situation that is more appropriate for non-autonomous control (e.g., a situation that the host vehicle 100 is not equipped to handle autonomously).

In response to receiving the handoff request, the processor 135 may access the database stored in the memory 130 to determine the driver competency. The driver competency may be associated with a profile of a particular vehicle occupant identified as the "driver". The processor 135 may identify the driver so, e.g., it can determine which profile to select. The identification of the driver may be based on, e.g., a person identified as the driver via a user input provided to the user interface 125, a person associated with a key used to access or start the host vehicle 100, a person identified as the driver by virtue of sitting in the driver seat, or a person identified as the driver by an occupant detection system including seat sensors, an interior camera, or the like. With the driver identified, the processor 135 may retrieve the profile, and the corresponding driver competency, from the database.

The processor 135 may be further programmed to compare the driver competency to the predetermined threshold. The predetermined threshold may represent a minimum level of skill needed to maintain control of the host vehicle 100 during the handoff procedure. Moreover, the driver competency, the predetermined threshold, or both, may be adjusted according to the circumstances in which the handoff is going to occur. For example, a handoff that occurs on a freeway while the host vehicle 100 is traveling at a high rate of speed may have a different predetermined threshold than a handoff that occurs on a surface street while the host vehicle 100 is stopped at a red light or stop sign. Alternatively or in addition, one driver competency may be applied for one situation (e.g., a handoff that occurs on a freeway at a high rate of speed) while a different driver competency may be applied for a different situation (e.g., a handoff that occurs while the host vehicle 100 is stopped at a red light or stop sign).

The processor 135 may be programmed to approve the handoff request if the driver competency exceeds the predetermined threshold and deny the handoff request otherwise. Approving the handoff request may include outputting a signal, to the autonomous mode controller 155, indicating that the handoff request has been approved. The signal approving the handoff request may command the autonomous mode controller 155 to allow the driver to assume non-autonomous control of the host vehicle 100. Denying the handoff request may include the processor 135 sending a signal, to the autonomous mode controller 155, that commands the autonomous mode controller 155 to keep controlling the host vehicle 100 in the autonomous mode of operation. In some instances, the signal denying the handoff request may command the autonomous mode controller 155 to operate the host vehicle 100 in a more limited way. For instance, the signal denying the handoff request may command the autonomous mode controller 155 to pull over to the side of the road, reduce its speed to a point where the handoff may be more appropriate given the skill of the driver, or the like. Instead of denying the handoff request, the processor 135 may determine, from the driver competency, that the driver would be able to execute the handoff if given additional time. Therefore, the processor 135 may be programmed to modify the handoff request to, e.g., give the driver additional warning that the handoff is about to occur, extend the length of the handoff procedure, or the like.

The processor 135 may be programmed to determine the driver competency through various tests and training sessions performed while the host vehicle 100 is operating in the autonomous mode and update the profile with the driver competency. Alternatively, the processor 135 may test driver competency when the host vehicle 100 is stationary, such as when the host vehicle 100 is parked. To determine the driver competency, the processor 135 may prompt the driver, via the user interface 125, to provide various driver inputs while the host vehicle 100 is operating in the autonomous mode. Examples of driver inputs may include turning the steering wheel 140, pressing the brake pedal 145, or pressing the accelerator pedal 150. The processor 135 may detect the driver inputs based on the signals output by the steering sensor 110, the brake sensor, and the accelerator pedal sensor 120. The processor 135 may further prompt the driver with more detailed instructions concerning the driver input. Examples of more detailed instructions may include moving the steering wheel 140 a quarter turn to the left (counterclockwise), moving the steering wheel 140 a quarter turn to the right (clockwise), gently applying pressure to the brake pedal 145, gently applying pressure to the accelerator pedal 150, etc. The processor 135 may further prompt the driver to provide driver inputs in a particular sequence. An example sequence may include prompting the driver to turn the steering wheel 140 counterclockwise a quarter turn, then apply pressure to the brake pedal 145, then apply pressure to the accelerator pedal 150, then apply pressure to the brake pedal 145 again.

Because the training occurs while the host vehicle 100 is operating in the autonomous mode, and because certain driver inputs may automatically cause the autonomous mode controller 155 to give control of the host vehicle 100 back to the driver, the driver inputs may inadvertently trigger the handoff. To counteract this, the processor 135 may prompt the driver, via the user interface 125, to slowly and gently provide the driver input. Moreover, in a drive-by-wire system, the processor 135 may "disconnect" by ignoring or desensitizing the vehicle's response to the steering wheel 140, and/or accelerator pedal 150, and/or brake pedal 145 positions, from actually controlling the host vehicle 100 so that the autonomous mode controller 155 will effectively ignore the driver inputs provided during the training session.

The processor 135 may evaluate the driver inputs provided in response to the various prompts and develop the driver competency accordingly. For instance, the processor 135 may be programmed to monitor the response time of the driver to provide the driver input. The processor 135 may be programmed to associate a faster response time to a higher driver competency. Thus, the processor 135 may compare the response time to an expected response time and set the driver competency accordingly. That is, if the response time exceeds (e.g., is faster than) the expected response time the processor 135 may set the driver competency to be higher than if the response time is below (e.g., slower than) the expected response time. Thus, this higher rating may allow a faster handoff relative to a planned handoff event.

In addition to the response time, the processor 135 may develop the driver competency according to a smoothness of the driver input. The smoothness may quantify how smoothly the driver provides the driver input, and the processor 135 may evaluate the smoothness of the driver input according to the signals output by the steering sensor 110, the brake sensor, and the accelerator sensor. Smooth driver inputs may be associated with a higher level driver competency while jerky movements may be associated with a lower level of driver competency. Thus, the processor 135 may associate jerky or erratic movements, overshoot, undershoot, etc., with reduced driver competency. Adjustments to the driver competency according to the smoothness of a driver input may be based on predetermined expected values associated with, e.g., how an average or experienced driver would provide such inputs.

The processor 135 may generate or update the profile associated with the driver after the driver competency has been established. Generating the profile may include storing the driver competency in the database and associating the profile to the present "driver" of the host vehicle 100. Updating an existing profile may include retrieving the profile associated with the present "driver" of the host vehicle 100 and replacing a previous driver competency with the newly established driver competency.

Further, before the handoff request is approved, the processor 135 may be programmed to prompt the driver to assume control of the host vehicle 100 according to the driver competency. For example, the processor 135 may output a signal, to the user interface 125, with a command to present the prompt to the driver. The signal may command the user interface 125 to present the prompt via a visual alert, and audible alert, or both. The prompt to the driver may be presented in accordance with the driver competency. A driver with a fast response time, for instance, may receive the prompt just seconds before the handoff is about to occur. A driver with a slower response time, however, may be given more time to respond to the prompt that the handoff is about to occur. Therefore, the processor 135 may use the driver competency to determine how much time is needed to properly warn the driver to assume control of the host vehicle 100 for the handoff procedure.

The processor 135 may further rely on the driver competency to account for certain actions that the driver may take during the handoff. For instance, if the driver competency shows that the driver is prone to jerky or erratic movements during the handoff, the processor 135 may command the autonomous mode controller 155, via a control signal, to resist certain movements of the steering wheel 140, the brake pedal 145, the accelerator pedal 150, or the like. The control signal may represent an amount of resistance to apply to the offending driver input. Thus, the control signal may command the autonomous mode controller 155 to actuate one or more actuators to resist driver inputs provided to the steering wheel 140, the accelerator pedal 150 (throttle), the brake pedal 145, or the like. Therefore, if the driver has a habit of overshooting, then the force applied to the steering wheel, as memorialized via the driver competency or profile, the autonomous mode controller 155 may apply a resistance to the steering wheel to mitigate or eliminate the overshoot. The same notion may apply to driver inputs provided to the accelerator pedal 150 and brake pedal 145.

Figure 3:
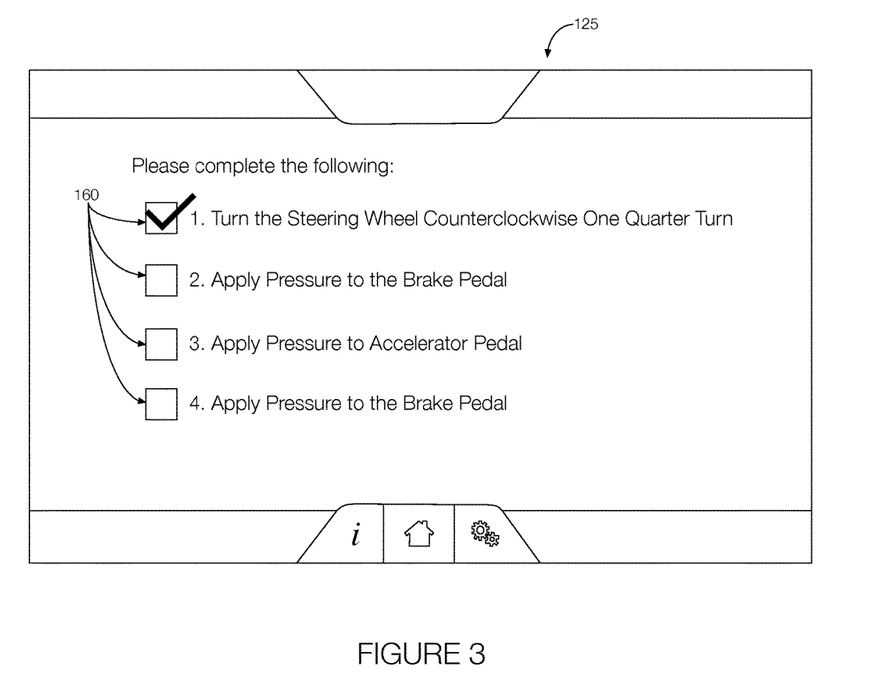
FIG. 3 is a graphical user interface that shows example prompts presented during a training session.

FIG. 3 represents an example view of the user interface 125 to assess the driver competence. As illustrated, the user interface 125 prompts to the driver to perform various actions (i.e., provide particular driver inputs). The driver's response to the prompts may be used to determine the driver competence for an immediate handoff or for a future handoff. As illustrated, the prompts require the driver to perform the following actions in the following order: turn the steering wheel 140 counterclockwise a quarter turn, apply pressure to the brake pedal 145, apply pressure to the accelerator pedal 150, apply pressure to the brake pedal 145.

A visual indicator 160 may be used to indicate that the processor 135 has registered that a particular action has been performed. For instance, a checkmark may appear next to the first line when the steering sensor 110 outputs a signal that the steering wheel 140 was turned counterclockwise a quarter turn with sufficient smoothness and with a sufficient response time. The processor 135 may receive such signals and command the user interface 125 to present the visual indicator 160 indicating that the step has been performed and to prompt the driver to provide the next driver input in the list. An audible indicator (e.g., a voice, a beep, or other type of alert) may accompany the visual indicator 160.

When visual indicators 160 appear next to each item presented, the processor 135 may output the signal approving the handoff request. Moreover, the processor 135 may update the profile associated with the driver in the database to create a record that the driver successfully performed the training session or that the driver was able to execute an immediate handoff.

Figure 4:
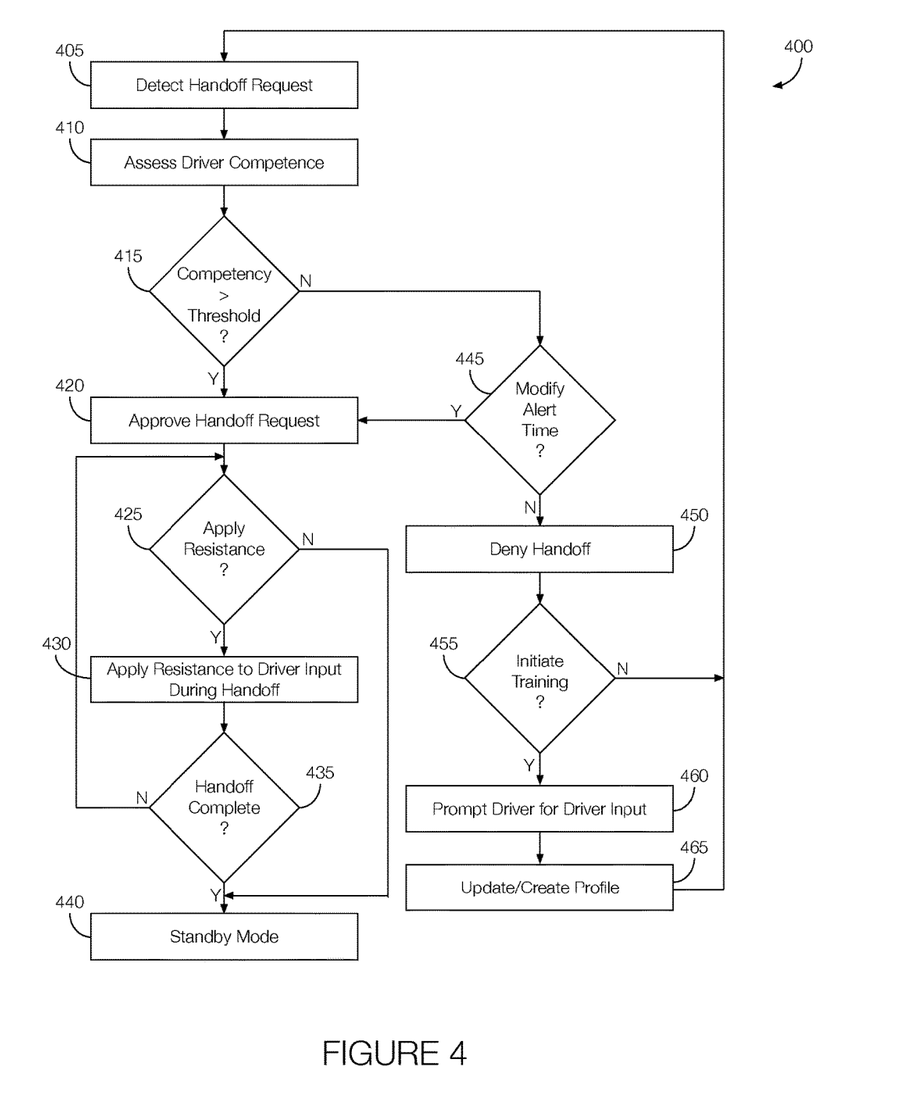
FIG. 4 is a flowchart of an example process that may be executed by the handoff system of FIG. 1 to facilitate the handoff to the non-autonomous mode of operation.

FIG. 4 is a flowchart of an example process 400 that may be executed by the handoff system 105 while the host vehicle 100 is operating in the autonomous mode. The process 400 may continue to execute until the host vehicle 100 is turned off, is no longer operating in an autonomous mode, or is no longer in a situation where a handoff could occur.

At block 405, the handoff system 105 detects a handoff request. The handoff request may indicate that the host vehicle 100 is going to transition from the autonomous mode of operation to the non-autonomous mode of operation. The handoff request may be generated by the autonomous mode controller 155 and may be received by the processor 135.

At block 410, the handoff system 105 assesses the driver competence. Assessing the driver competence may include the processor 135 identifying the driver, retrieving the corresponding profile from the memory 130, and retrieving the driver competence stored in the profile.

At decision block 415, the handoff system 105 determines whether the driver competency stored in the profile exceeds a predetermined threshold. The predetermined threshold may represent a minimum level of skill needed to maintain control of the host vehicle 100 during the handoff procedure. Both the driver competency and the predetermined threshold may be quantifiable values. If the processor 135 determines that the driver competency exceeds the predetermined threshold, the process 400 may proceed to block 420. If the processor 135 determines that the driver competency does not exceed the predetermined threshold, the process 400 may proceed to block 445. Other reasons the process 400 may proceed to block 445 include if the driver has never completed a training session, there is no profile associated with the driver, or if there is no driver competency associated with the profile.

At block 420, the handoff system 105 approves the handoff request. Approving the handoff request may include the processor 135 outputting a signal, to the autonomous mode controller 155, indicating that the handoff request has been approved. The signal approving the handoff request may command the autonomous mode controller 155 to allow the driver to assume non-autonomous control of the host vehicle 100. Further, approving the handoff request may include a notification to the driver instructing the driver to begin controlling the host vehicle 100. The notification may be transmitted to the driver a predetermined amount of time before the handoff occurs. That predetermined amount of time may be based on the driver competency, a characteristic of the driver competency, or both. For instance, the predetermined amount of time may be shorter for drivers with faster response times and longer for drivers with slower response times.

At decision block 425, the handoff system 105 determines whether any corrective actions are needed to help facilitate the handoff given the driver's competency level. For instance, based on the driver competency stored in the database, the processor 135 may determine whether to apply resistance to certain driver inputs, including inputs to the steering wheel 140, the brake pedal 145, or the accelerator pedal 150. For instance, the processor 135 may determine if the driver competency shows that the driver is prone to jerky or erratic movements during the handoff. If so, the process 400 may proceed to block 430. Otherwise, the process 400 may proceed to block 440.

At block 430, the handoff system 105 applies resistance to one or more of the driver inputs. Applying resistance to the driver input may include the processor 135 commanding the autonomous mode controller 155, via a control signal, to resist certain movements of the steering wheel 140, the brake pedal 145, the accelerator pedal 150, or the like. The control signal may represent an amount of resistance to apply to the offending driver input. Thus, the control signal may command the autonomous mode controller 155 to actuate one or more actuators to resist driver inputs provided to the steering wheel 140, the accelerator pedal 150 (throttle), the brake pedal 145, or the like. Therefore, if the driver has a habit of overshooting the pressure applied to the accelerator pedal 150, as memorialized via the driver competency or profile, the autonomous mode controller 155 may apply a resistance to the accelerator pedal 150 to mitigate or eliminate the overshoot. The same notion may apply to driver inputs provided to the steering wheel 140 and brake pedal 145.

At decision block 435, the handoff system 105 may determine if the handoff procedure is complete. If so, the process 400 may proceed to block 440. Otherwise, the process 400 may return to block 425 to determine whether additional resistance should be applied.

At block 440, the handoff system 105 begins operating in a standby mode. At this point in the process, the handoff procedure is complete and no further interventions may be needed from the handoff system 105. Thus, the process 400 may effectively end until the host vehicle 100 begins to operate in the autonomous mode again, at which case the process 400 may begin again at block 405.

At decision block 445, the handoff system 105 determines whether the handoff can be executed, despite the driver competency being less than the predetermined threshold, if the driver is given more time to respond (i.e., whether to modify the handoff request to extend the alert time and whether extending the alert time will allow the handoff request to proceed). For instance, the processor 135 may determine, from the driver competency, that the driver would be able to perform the handoff if given more time to prepare. The processor 135 may make such a determination if, e.g., the driver competency indicates that the driver has a slower response time but is otherwise a skilled driver. If the processor 135 determines that the handoff can be executed with the modified alert time (e.g., given more time to prepare for and execute the handoff), the alert time may be updated and the process 400 may proceed to block 420 with the new alert time. If the processor 135 determines that the driver is unable execute the handoff even with additional alert time, the process 400 may proceed to block 450.

At block 450, the handoff system 105 denies the handoff request. Denying the handoff request may include the processor 135 sending a signal, to the autonomous mode controller 155, that commands the autonomous mode controller 155 to keep controlling the host vehicle 100 in the autonomous mode of operation. In some instances, the signal denying the handoff request may command the autonomous mode controller 155 to operate the host vehicle 100 in a more limited way. For instance, the signal denying the handoff request may command the autonomous mode controller 155 to pull over to the side of the road, reduce its speed to a point where the handoff may be more appropriate given the skill of the driver, or the like.

At decision block 455, the handoff system 105 determines whether to initiate a training session to assess or improve driver competency. For instance, the processor 135 may determine that a training session is necessary given the circumstances surrounding the handoff procedure. The processor 135 may further determine to proceed with the training session if the user interface 125 receives a user input agreeing to participate in the training session. If the processor 135 decides to initiate the training session, the process 400 may proceed to block 460. If the processor 135 decides not to initiate the training session, the process 400 may proceed to block 405 to await another handoff request. In the meantime, the autonomous mode controller 155 may cause the host vehicle 100 to pull over to the side of the road so that the driver can assume non-autonomous control without a handoff, reduce its speed to a point where the handoff may be more appropriate given the skill of the driver, or the like.

At block 460, the handoff system 105 begins the training session to determine the driver competency. That is, the processor 135 may prompt the driver, via the user interface 125, to provide various driver inputs while the host vehicle 100 continues to operate in the autonomous mode. Examples of driver inputs may include turning the steering wheel 140, pressing the brake pedal 145, or pressing the accelerator pedal 150. The processor 135 may detect the driver inputs based on the signals output by the steering sensor 110, the brake sensor, and the accelerator pedal sensor 120. The processor 135 may further prompt the driver with more detailed instructions concerning the driver input. Examples of more detailed instructions may include moving the steering wheel 140 a quarter turn to the left (counterclockwise), moving the steering wheel 140 a quarter turn to the right (clockwise), gently applying pressure to the brake pedal 145, gently applying pressure to the accelerator pedal 150, etc. The processor 135 may further prompt the driver to provide driver inputs in a particular sequence. An example sequence may include prompting the driver to turn the steering wheel 140 counterclockwise a quarter turn, then apply pressure to the brake pedal 145, then apply pressure to the accelerator pedal 150, then apply pressure to the brake pedal 145 again. The processor 135 may record the response time, smoothness, and possibly other characteristics of the driver input, and use such characteristics to develop the new or updated driver competency.

At block 465, the handoff system 105 updates the profile (or creates a new profile) with the driver competency as a result from the training session performed at block 460. That is, the processor 135 may update the profile stored in the memory 130 with the new driver competency. Therefore, the driver competency will be stored in the database for future reference.

The process 400 may proceed to block 405 to await a subsequent handoff request. The process 400 may repeat from that point so that the most recent driver competency obtained during previous iterations of the process 400 can be considered for the most recent handoff request.

The handoff system 105 addresses various handoff-related concerns by evaluating a driver's skill prior to allowing the handoff to occur. For less experienced drivers, the handoff system 105 allows them to participate in various exercises to increase their driver competency. The exercises may include providing driver inputs to the steering wheel 140, brake pedal 145, or accelerator pedal 150. The driver competency may increase according to how well the driver responds to various prompts that are presented while the vehicle is operating autonomously.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc.

Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising a processor and a memory accessible to the processor and storing instructions executable by the processor, the instructions including:
   detecting a handoff request indicating a transition of a host vehicle from an autonomous mode of operation to a non-autonomous mode of operation;
   assessing driver competency;
   approving the handoff request as a result of the driver competency exceeding a predetermined threshold and denying the handoff request as a result of the driver competency failing to exceed the predetermined threshold; and
   prompting a driver to assume control of the host vehicle as a result of approving the handoff request, wherein prompting the driver to assume control of the host vehicle includes prompting the driver a predetermined amount of time before the transition from the autonomous mode of operation to the non-autonomous mode of operation, wherein the predetermined amount of time before the transition from the autonomous mode of operation to the non-autonomous mode of operation changes in accordance with the driver competency.

2. The vehicle system of claim 1, wherein the instructions further include determining the driver competency.

3. The vehicle system of claim 2, wherein determining the driver competency includes prompting the driver for a driver input while the host vehicle is operating in the autonomous mode.

4. The vehicle system of claim 3, wherein determining the driver competency includes monitoring a response time of the driver to provide the driver input.

5. The vehicle system of claim 3, wherein determining the driver competency includes determining a smoothness of the driver input.

6. The vehicle system of claim 2, wherein determining the driver competency includes comparing at least one characteristic of the driver input to a predetermined value, wherein the at least one characteristic includes at least one of a response time for the driver to provide the driver input and a smoothness of the driver input.

7. The vehicle system of claim 1, the instructions further comprising, if the driver competency fails to exceed the predetermined threshold and before denying the handoff request, determining whether to approve the handoff request with a modified alert time.

8. The vehicle system of claim 1, wherein assessing the driver competency includes:
identifying a driver of the host vehicle;
accessing a profile associated with the driver of the host vehicle; and
retrieving the driver competency from the profile associated with the driver of the host vehicle.

9. The vehicle system of claim 8, wherein the instructions further include:
generating the profile; and
associating the profile to the driver of the host vehicle.

10. The vehicle system of claim 1, wherein the instructions further include resisting a driver input during the transition from the autonomous mode of operation to the non-autonomous mode of operation.

11. The vehicle system of claim 10, wherein resisting the driver input includes outputting a control signal to an autonomous mode controller to at least partially oppose the driver input provided to at least one of a steering wheel, an accelerator pedal, and a brake pedal to reduce overshoot of the driver input.

12. The vehicle system of claim 11, wherein the control signal represents an amount of resistance based at least in part on the driver competency.

13. A method comprising:
detecting a handoff request indicating a transition of a host vehicle from an autonomous mode of operation to a non-autonomous mode of operation;
assessing driver competency;
approving the handoff request as a result of the driver competency exceeding a predetermined threshold and denying the handoff request as a result of the driver competency failing to exceed the predetermined threshold; and
prompting a driver to assume control of the host vehicle as a result of approving the handoff request at least a predetermined amount of time before the transition from the autonomous mode of operation to the non-autonomous mode of operation, wherein the predetermined amount of time changes in accordance with the driver competency.

14. The method of claim 13, further comprising determining the driver competency by prompting the driver for a driver input while the host vehicle is operating in the autonomous mode and monitoring at least one of a response time of the driver to provide the driver input and a smoothness of the driver input.

15. The method of claim 13, further comprising resisting a driver input during the transition from the autonomous mode of operation to the non-autonomous mode of operation, wherein resisting the driver input includes outputting a control signal to an autonomous mode controller to at least partially oppose the driver input provided to at least one of a steering wheel, an accelerator pedal, and a brake pedal, wherein the control signal represents an amount of resistance based at least in part on the driver competency and wherein the control signal reduces overshoot of the driver input.

16. The method of claim 13, further comprising, as a result of the driver competency failing to exceed the predetermined threshold and before denying the handoff request, determining whether to approve the handoff request with a modified alert time.

* * * * *